United States Patent
Zhong et al.

(10) Patent No.: US 12,429,697 B1
(45) Date of Patent: Sep. 30, 2025

(54) CONTACT LENS SHIFT DETECTION FOR HEAD-MOUNTED DISPLAY DEVICES

(71) Applicant: Apple Inc., Cupertino, CA (US)

(72) Inventors: Jie Zhong, Kornwestheim (DE); Hao Qin, Saratoga, CA (US); Chia-Yin Tsai, Sunnyvale, CA (US); Tom Sengelaub, Oakland, CA (US); Hua Gao, San Jose, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 18/470,735

(22) Filed: Sep. 20, 2023

Related U.S. Application Data (60) Provisional application No. 63/376,950, filed on Sep. 23, 2022.

(51) Int. Cl.
  *G02B 27/01* (2006.01)
  *G02B 27/00* (2006.01)
  *G06F 3/01* (2006.01)

(52) U.S. Cl.
  CPC ..... *G02B 27/0172* (2013.01); *G02B 27/0093* (2013.01); *G06F 3/013* (2013.01); *G02B 2027/0138* (2013.01); *G02B 2027/014* (2013.01); *G02B 2027/0141* (2013.01)

(58) Field of Classification Search
  CPC ............ G02B 27/0172; G02B 27/0093; G02B 2027/0138; G02B 2027/014; G02B 2027/0141; G06F 3/013
  See application file for complete search history.

(56) References Cited

U.S. PATENT DOCUMENTS

| | | | |
|---|---|---|---|
| 9,503,713 B2 | 11/2016 | Zhao et al. | |
| 9,857,870 B2 | 1/2018 | Lee et al. | |
| 10,936,056 B2 | 3/2021 | Aleem et al. | |
| 11,768,926 B2 | 9/2023 | Czajka et al. | |
| 2017/0329400 A1* | 11/2017 | Noda | G06F 3/013 |
| 2020/0154997 A1* | 5/2020 | Noda | A61B 3/0091 |
| 2024/0005698 A1* | 1/2024 | Thier | G06V 40/19 |

OTHER PUBLICATIONS

Oberg Erik et al., Machinery's Handbook, 2004, Industrial Press Inc, 27th Edition, pp. 1245-1246 (Year: 2004).*

* cited by examiner

*Primary Examiner* — Liliana Cerullo
(74) *Attorney, Agent, or Firm* — Alexander A. Knapp; Kowert, Hood, Munyon, Rankin & Goetzel, P.C.

(57) ABSTRACT

Systems and methods are disclosed to enable detection of excessive contact lens shift in a head-mounted display (HMD) device that implement gaze tracking for the user. In embodiments, during a user enrollment process to calibrate the gaze tracking system, the HMD device analyzes key frames of the eye to estimate a first center location of the eye based on detected eye features such as the pupil, the iris, or the limbus, and a second center location of the eye based on the shape of the detected cornea. Shift vectors are generated based on the two center locations for individual key frames. If the standard deviation of the vectors' magnitudes exceeds a specified threshold, excessive lens shift is detected. In response to detection of excessive contact lens shift, the HMD device may generate a notification to the user or activate compensation mechanisms.

20 Claims, 5 Drawing Sheets

CONTACT LENS SHIFT DETECTION FOR HEAD-MOUNTED DISPLAY DEVICES

BACKGROUND

This application claims benefit of priority to U.S. Provisional Application Ser. No. 63/376,950, entitled "CONTACT LENS SHIFT DETECTION FOR HEAD-MOUNTED DISPLAY DEVICES," filed Sep. 23, 2022, and which is hereby incorporated herein by reference in its entirety.

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) or augmented reality (AR) systems combine computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus are disclosed to enable detection of excessive contact lens shift in a head-mounted display (HMD) device that implement gaze tracking for the user. In embodiments, during a user enrollment process to calibrate the gaze tracking system, the HMD device analyzes key frames of the eye to estimate a first center location of the eye based on detected eye features such as the pupil, the iris, or the limbus, and a second center location of the eye based on the shape of the detected cornea, which may be a contact lens. Shift vectors are generated for individual key frames based on the two center locations. The standard deviation of the shift vectors' magnitudes is calculated. If the standard deviation exceeds a specified threshold, the HMD device determines that there is a contact lens in front of the eye with excessive lens shift. In response to this detection, the HMD device may generate a notification to the user or activate compensation mechanisms to compensate for the lens shift during operation of the gaze tracking system. In some embodiments, the detection process may be repeated during gaze tracking operation to monitor the contact lens shift.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in a manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus are described for detection of excessively shifting contact lenses in head-mounted display (HMD) devices. HMDs may include devices such as headsets, helmets, goggles, or glasses, etc., that are designed to be worn by a user and include a display mechanism (e.g., left and right near-eye display panels) for displaying visual content to the user. In some embodiments, the display mechanism may include displays for both eyes of the user to provide 3D visual views to the user. In some embodiments, the HMD may be a virtual reality (VR) or augmented reality (AR) device. For AR applications, the HMD may include or be coupled to one or more external video cameras that capture video of the user's environment for display. The HMD may include a controller component that renders frames for display to the left and right displays. Alternatively, the controller component may be implemented by an external device that is coupled to the HMD via a wired or wireless connection.

In some embodiments, the HMD device may implement a gaze tracking system that tracks the gaze direction of the user's eyes. The gaze tracking system may include at least one eye tracking camera (e.g., infrared (IR) or near-IR (NIR) cameras) positioned at each side of the user's face, and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. Image(s) captured by the eye tracking camera(s) (in particular the reflection or "glints" of the LED lights) are analyzed using an eye model previously calibrated for the user during a user enrollment process. The result of the analysis may include a current pose of the eye and the current gaze direction of the eye. The gaze direction of the eye are continuously tracked by the gaze tracking system to enable a variety of HMD functionalities.

In some embodiments, the gaze tracking system assumes that various elements of the eye (the pupil, the iris, the limbus, etc.) are coupled to the anterior cornea surface, so that the cornea does not shift excessively with respect to the rest of the eye. If a user is wearing a contact lens that shifts excessively with respect to the eye surface (e.g. due to an improper lens fit or dry eye surface), the coupling assumption is broken. This situation may result in gaze tracking inaccuracies and other types of performance degradation of the gaze tracking system.

To address these problems in current HMD devices with gaze tracking, embodiments of a contact lens shift detection system is described herein, capable of detecting when the user of the HMD device is wearing an excessively shifting contact lens. If a shifting contact lens is detected, the HMD device will generate a notification or warning to the user and suggest possible solutions (e.g. switching to a clip-on lens that is fixed to the HMD device). In some embodiments, the HMD device may automatically activate a compensation mechanism or algorithm in the gaze tracker to compensate for the lens shift. In some embodiments, if the detected lens shift is severe, the HMD device may simply prevent operation of the gaze tracker.

In some embodiments, the contact lens shift detection may be performed during the user enrollment process of the HMD device, where the gaze tracking system is calibrated to the user's eyes. The enrollment process may capture multiple key frames of the user's eye in different orientations, and use the key frames to construct an eye model that is specific to the user. The contact lens shift detection process may be performed in parallel with the eye modeling process (e.g. using the same key frames). In some embodiments, the detection process may estimate, based on the key frames, a set of shift vectors of the eye. A shift vector may be a vector in a two-dimensional projection plane corresponding to the eye surface, and represent the difference between two estimated center locations of the eye. A first center location of the eye may be estimated based on eye feature(s) such as the pupil and the limbus, and a second center location of the eye is estimated based on the shape of the detected cornea, which may be a contact lens. A standard deviation of the magnitudes of the shift vectors are calculated. If this standard deviation value exceeds a set threshold (e.g. based on a tolerance level of the gaze tracking system), an excessively shifting contact lens has been detected. In some embodiments, this detection process may be repeated during operation of the gaze tracking system to continuously monitor for contact lens shift during operation.

Figure 1:
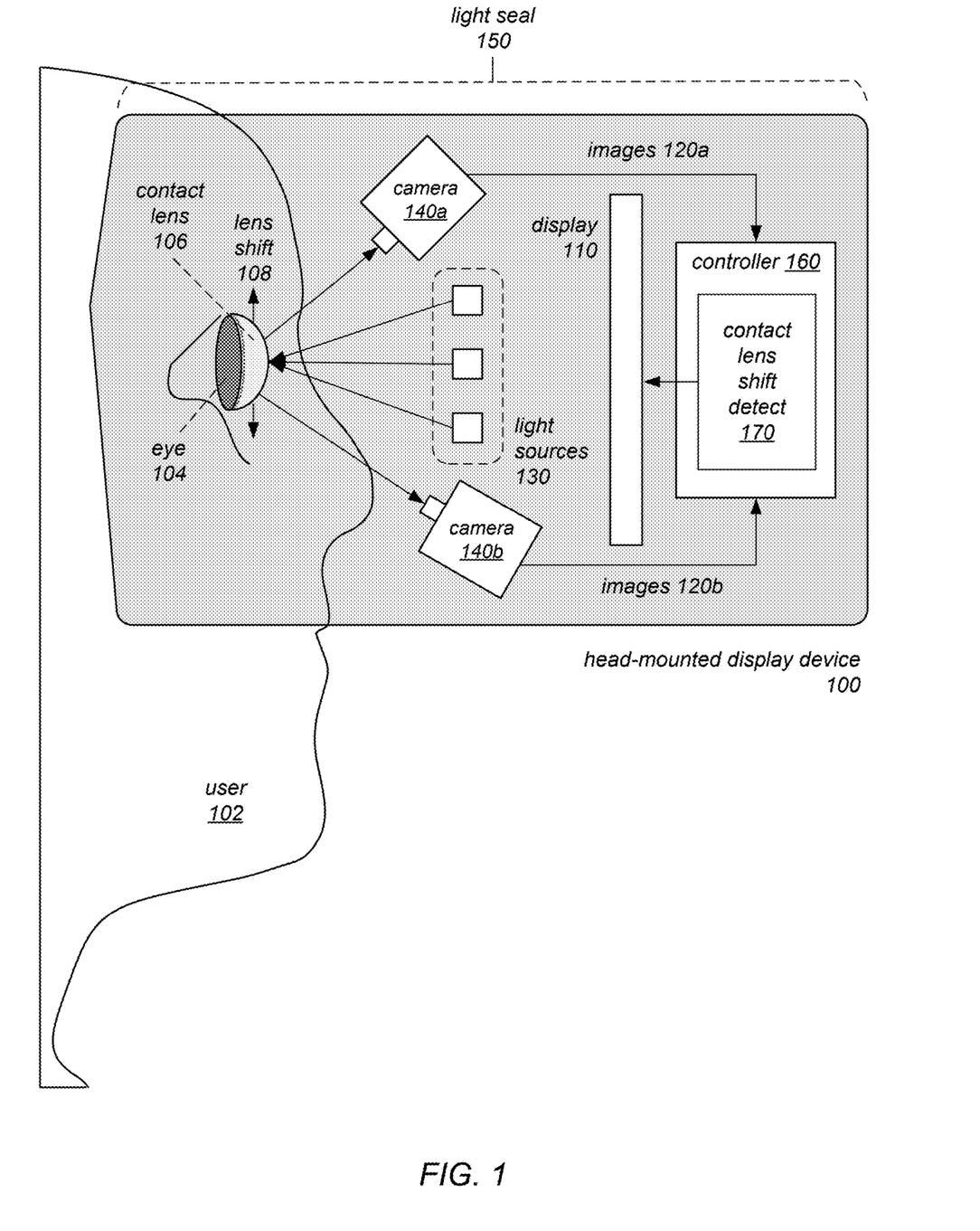
FIG. 1 illustrates a head mounted display (HMD) device that implements contact lens shift detection to detect when a user is wearing a contact lens that shifts excessively relative to the user's eye, according to some embodiments.

FIG. 1 illustrates an HMD device that implements a lens distance test to determine the distance between the eye of a user and a lens of the HMD, according to some embodiments.

As shown, the figure depicts an HMD device 100 worn by a user 102. The HMD 100 may include, but is not limited to, a display 110 (e.g., a left and right display panel), and a gaze tracking system that includes one or more eye tracking camera(s) 140a and 140b (e.g., infrared (IR) or near-IR (NIR) cameras), and one or more illumination source(s) 130 (e.g., IR or NIR light sources such as an array or ring of NIR light-emitting diodes (LEDs)) that emit light (e.g., IR or NIR light) towards the user's eyes 104. In some embodiments, the gaze tracking system may employ at least two cameras for each eye, including one camera 140a that is located above or at level with the user's nose, and a second camera 140b that is located beneath the user's eye 104. The two cameras may be positioned so that their captured image(s) 120a and 120b can be combined to produce a stereoscopic or three-dimensional view of the eye 104, which allows the gaze tracking system to make accurate estimations of the eye's pose or gaze direction. Depending on the embodiment, the eye tracking cameras 140 may be pointed towards mirrors located between the user's eyes 104 and the display 110 that reflect IR or NIR light from the eyes 104 while allowing visible light to pass, or alternatively pointed towards the user's eyes 104 to receive reflected IR or NIR light from the eyes 104 as shown in the figure.

As shown, the HMD 100 may include a light seal 150 that encloses light generated by the display 110 so that visual content generated by the display appears brighter to the user 102. The light seal 150 may also be fitted to the user 102, for example, adjusted to a particular shape to fit the user's facial structure or place the display 110 at a particular distance 170 from the user's eyes.

In some embodiments, the HMD 100 may include a controller 160 configured to render AR or VR content (e.g., left and right frames for left and right display panels) and provide the frames to the display 110. In some embodiments, the controller 160 may be integrated in the HMD. In some embodiments, the controller 160 may be a computer device with its own processors and memory. In some embodiments, at least some functionality of the controller 160 may be implemented by a device external to the HMD and coupled to the HMD by a wired or wireless connection.

In some embodiments, the controller 160 implements gaze tracking using eye tracking camera(s) 140 for various purposes. The controller 160 may estimate the user's point of gaze on the display 110 based on the gaze tracking input obtained from the eye tracking cameras 140 using glints or reflections from the eye produced by the light source(s) 130. The point of gaze estimated from the gaze tracking input may be used to determine the direction in which the user is currently looking.

In some embodiments, the light source(s) 130 may be arranged in a circle around the display lenses of the HMD. However, in other embodiments, more or fewer light sources 130 may be used, and other arrangements and locations of light sources 130 may be used. In some embodiments, the eye tracking cameras 140 may be pointed towards mirrors located between the user's eyes 104 and the display 110 to reflect IR or NIR light from the eyes 104 while allowing visible light to pass. In other embodiments, the light sources 130 may be pointed towards the user's eyes 104 to receive reflected IR or NIR light from the eyes 104, as shown.

As shown, in the controller 160 of the HMD 100 may implement a contact lens shift detection component 170 to perform the contact lens shift detection functionality described herein. As discussed, the contact lens shift detection may be performed during a user enrollment process of the user or at various times during the operation of the HMD to monitor the shiftiness of the contact lens. In some embodiments, the user enrollment process will construct an eye model for each eye of the user. The eye model may implement a function that takes the eye images 120 captured by the camera(s) 140 (or the glint readings) and translate the data to a particular 3D pose of the eye (e.g. the current positions of the cornea center, optical axis, pupil, etc.). Depending on the embodiment, the contact lens shift detection may be performed in parallel with the construction of the eye model or afterwards, using the constructed eye model.

In some embodiments, if a shifting contact lens is detected by the contact lens shift detector 170, a user notification or warning is displayed via the display 110. In some embodiments, the threshold for detecting an excessively shifting contact lens may be configurable via a configuration interface of the HMD 100. In some embodiments, the HMD may be configured with multiple contact lens shift thresholds. For example, exceeding a first threshold may only cause the HMD to generate a warning, and exceeding a second threshold may cause the HMD to activate compensation or mitigation measures, or prevent the HMD from operating altogether.

Figure 2:
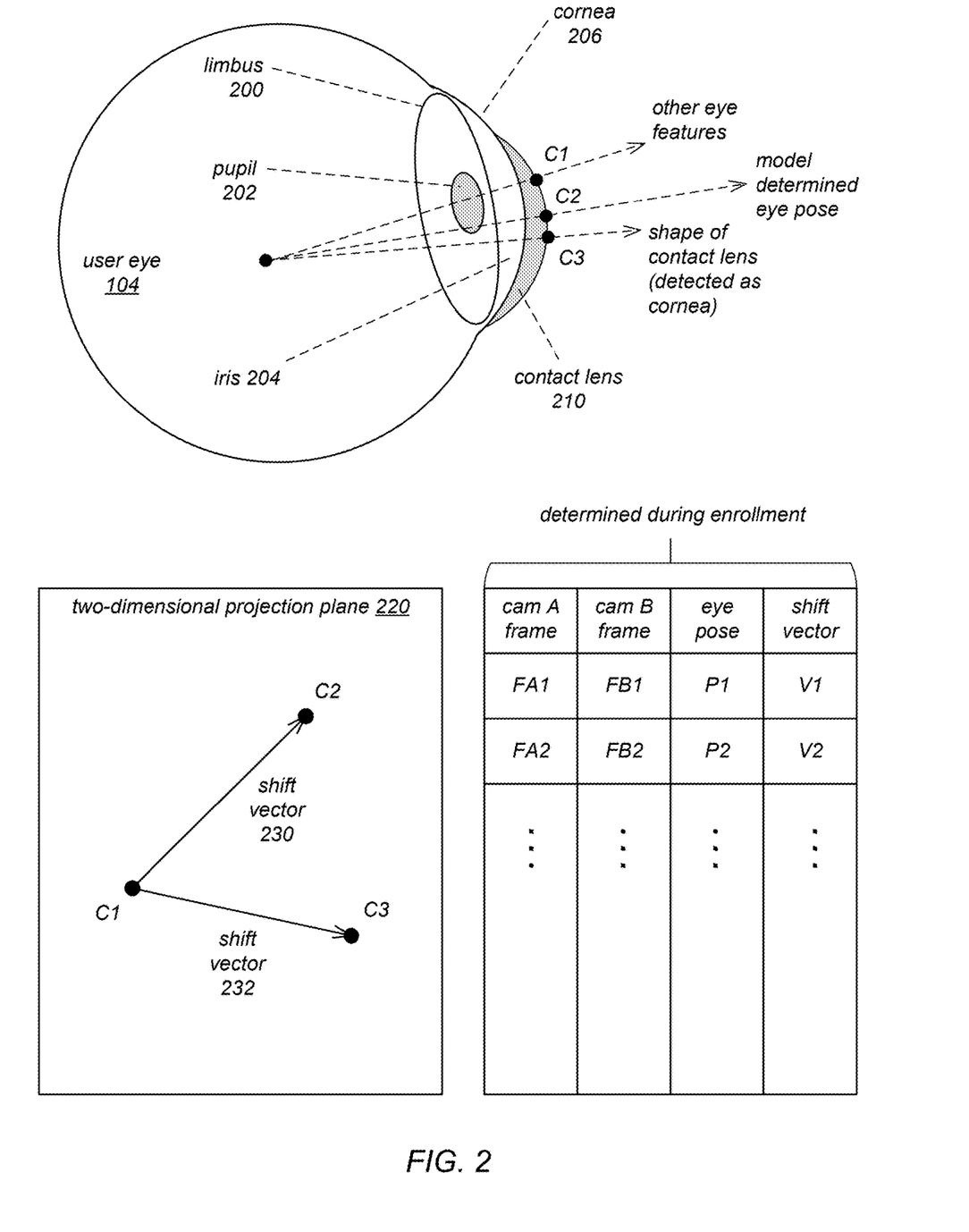
FIG. 2 illustrates the determination of shift vectors during the contact lens shift detection process performed by the HMD device, according to some embodiments.

FIG. 2 illustrates the determination of shift vectors during the contact lens shift detection process performed by the HMD device, according to some embodiments.

The top portion of FIG. 2 shows the user eye 104 and three types of eye center locations C1, C2, and C3 that may be estimated for the user eye during a contact lens shift detection. The figure illustrates various elements of the eye, such as the limbus 200, the pupil 202, the iris 204, and the cornea 206. The user eye is disposed behind a contact lens 210, which may be shifting excessively relative to the eye surface as the eye moves. As discussed, this shifting may be caused by a number of issues, such as a contact lens that does not fit the curvature of the eye, or an excessively dry eye surface, etc.

The eye center locations C1, C2, and C3 are determined in different ways. In some embodiments, center location C3 on the surface of the eye is determined based on the shape of the detected cornea of the eye, which may actually be the shape of the contact lens 210. If the contact lens 210 is shifting, relative to the eye 104, this center location C3 will deviate from the true center location of the eye, which is the location on the eye surface that lies on the optical axis of the eye. In some embodiments, this true center location is estimated as center location C1, which is determined based on other features of the eye (e.g. not including the cornea). For example, center location C1 may be determined based on the detected locations and/or shapes of the limbus 200, pupil 202, and/or iris 204. In some embodiments, center location C1 may be determined based on an average of locations determined based on these various eye features. The difference between center locations C1 and C3 represents a shift of the contact lens in the current eye pose.

In some embodiments, center location C2 on the surface of the eye may be used as an alternative indicator of contact lens shift, in place of or in addition to location C3. As shown, center location C2 may be determined based on a pose of the eye generated by an eye model. The eye model may represent a function that translates the camera image(s) and the LED glints to a current 3D configuration of the eye. In some embodiments, the eye model may be constructed based on models of individual elements of the eye, such as a cornea model, a pupil model, etc. The eye model may be calibrated during the user enrollment phase of the HMD device. If the enrollment process was performed with the contact lens 210, the resulting eye pose will include a degree of error caused by the shift of the contact lens. As a result, the difference between center point C1 and C2 may also be used as another indication of contact lens shift. Center point C2 may be used in place of center point C1 in situations where the eye model has already been calibrated, for example, during operation of the gaze tracking system.

In some embodiments, the center points C1, C2, and/or C3 may be projected into a two-dimensional plane 220 corresponding to the surface of the eye, as shown in the bottom of the figure. In this 2D projection plane 220, shift vector(s) are determined between the center points. For example, a shift vector 230 may be determined between points C1 and C2. As another example, a shift vector 232 may be determined between points C1 and C3.

As shown, the user enrollment process may determine shift vectors for multiple poses or orientations of the eye 140. The user enrollment process may instruct the user to orient the eye towards a series of gaze location (e.g. key locations) displayed on the display, and take a set of images (e.g. keyframes) for each eye pose (e.g. keyframes FA1, FA2, FB1, FB2, etc.). Using these keyframes, a set of shift vectors (e.g. vectors V1, V2, etc.) are determined for each eye pose. These shift vectors are then used to quantify the contact lens shift associated with the eye, and determine whether the degree of contact lens shift is excessive (e.g. whether the shift can be tolerated by the gaze tracking system). In some embodiments, the enrollment process may also determine a series of eye pose parameters for each keyframe, which are stored as part of the eye model. In some embodiments, the shift vectors may be determined at the same time as the eye poses, during the eye model construction process. In some embodiments, the shift vectors may be considered part of the eye model, and used by the gaze tracking system to compensate for the contact lens shift during operation.

Figure 3:
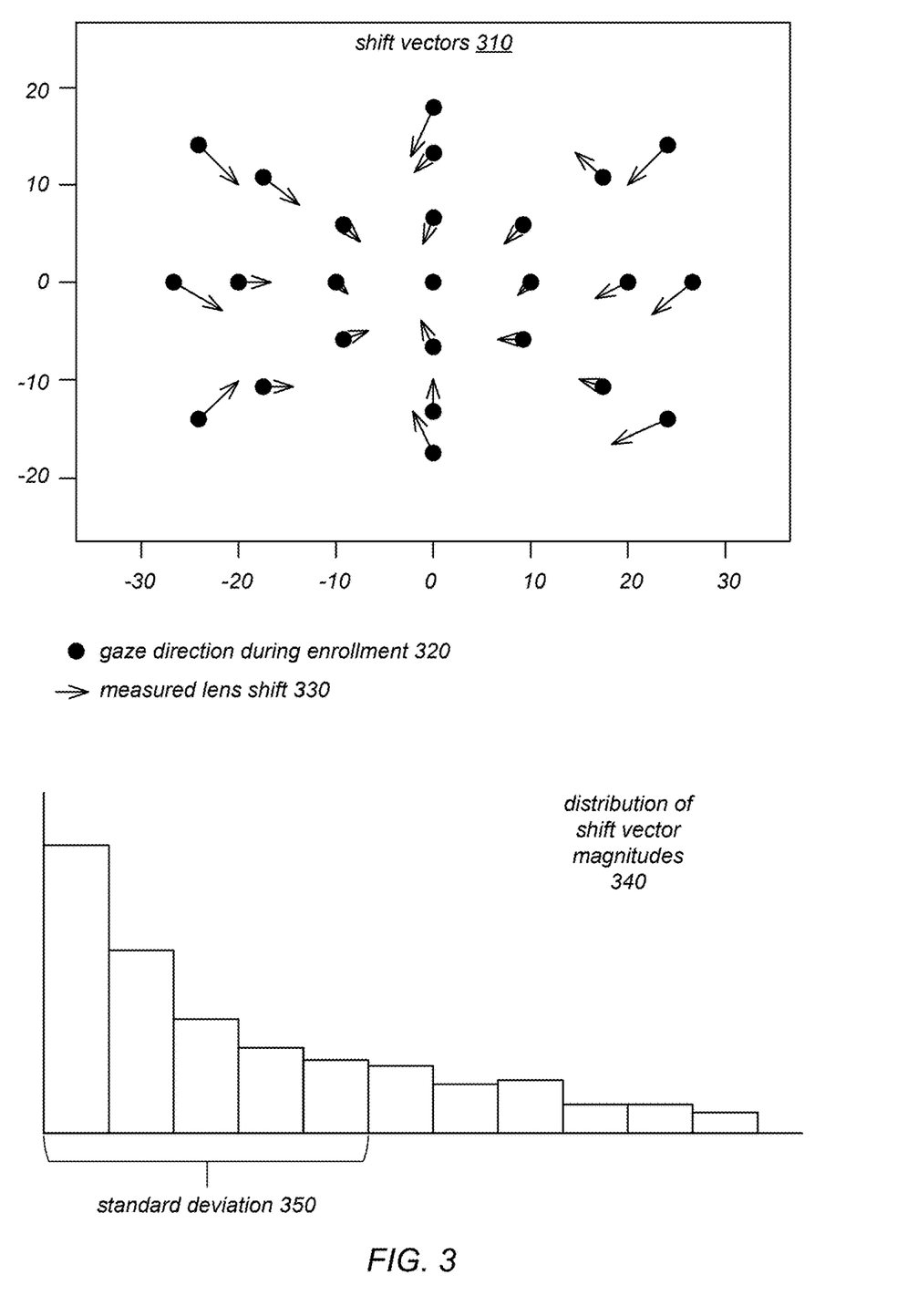
FIG. 3 illustrates an analysis of shift vectors for multiple eye poses to detect excessive contact lens shift, according to some embodiments.

FIG. 3 illustrates an analysis of shift vectors for multiple eye poses to detect excessive contact lens shift, according to some embodiments.

In the top portion of the figure, a set of shift vectors 310 determined as a result of a user enrollment process is shown.

The shift vectors 310 represent a measured lens shift 330 at a particular eye pose, and each vector is shown with a dot that represents the particular gaze direction or eye pose during the enrollment process that was associated with the measured shift. As shown in this example, the contact lens tended to move less as the eye gaze moved towards the periphery of the field of vision. However, depending on the user, other types of contact lens shifting behaviors are possible.

The bottom portion of the figure indicates an example way of quantifying the contact lens shift based on the shift vectors 310. In some embodiments, the HMD may determine a standard deviation 350 of the magnitudes of all shift vectors 310. The bottom portion of the figure shows a hypothetical distribution 340 of these magnitudes. As shown, most of the shift vectors 310 had relatively small magnitudes near zero, but a substantial number of the shift vectors 330 had large magnitudes, indicating significant shift. The standard deviation 350 of the distribution 340 grows when there are more large-magnitude vectors, and shrinks when there are more small-magnitude vectors, and thus represents one way of quantifying the amount of contact lens shift associated with the eye. In some embodiments, the standard deviation 350 is compared to a pre-set threshold value to determine whether the amount of contact lens shift of the eye is excessive.

Figure 4:
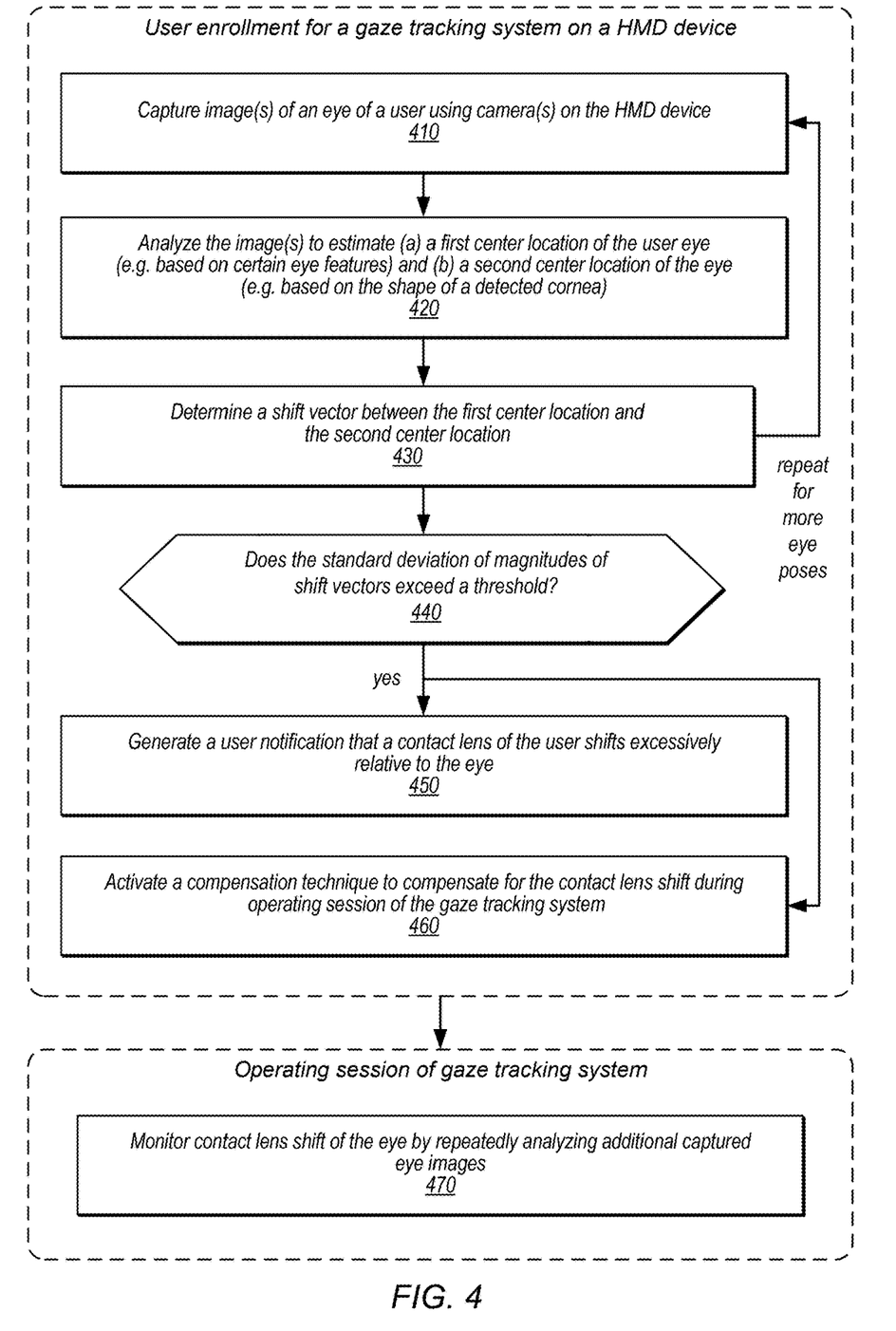
FIG. 4 is a flowchart illustrating a process of detecting excessive contact lens shift by a HMD device and actions performed in response to the detection, according to some embodiments.

FIG. 4 is a flowchart illustrating a process of detecting excessive contact lens shift by a HMD device and actions performed in response to the detection, according to some embodiments. The HMD device may be an embodiment of the HMD device 100 discussed in connection with FIG. 1.

As shown, operations 410 to 460 are performed as part of a user enrollment for a gaze tracking system of the HMD device. As discussed, the user enrollment process may instruct the user to gaze towards a series of key locations on the display of the HMD device, and capture keyframes of the user's eye at each gaze direction or eye pose. The key frames are used to construct a user eye model for use during gaze tracking. In some embodiments, the contact lens shift detection may be performed along with the eye model construction process and using the same keyframes.

At operation 410, image(s) of the user eye (e.g. images 120a and 120b) are captured using cameras of the HMD device. These cameras may be eye-tracking cameras (e.g. cameras 140a and 140b) used by the gaze tracking system. In some embodiments, the cameras may be located above and beneath the user eye, and the images captured by the cameras are combined to create a stereoscopic view of the eye in 3D. The captured images may contain glints produced by light sources such as LEDs, which can be used to estimate the shape of various elements of the eye. The images captured in this operation may be associated with a single eye pose used during the user enrollment process.

At operation 420, the captured images are analyzed to estimate two center locations on the surface of the eye (e.g. center locations C1, C2, and/or C3) of FIG. 2. In some embodiments, a first center location (e.g. an estimated true center location) is determined based on certain eye features (e.g. the pupil, the limbus, the iris) that are not depending on the eye corneal surface. Center location C1 is an example of the first center location. A second center location may be a location that is dependent on the location and/or shape of the cornea, such as center locations C2 or C3 in FIG. 2. As discussed, in some embodiments, this second center location may be determined based on the shape of the detected cornea. In some embodiments, the second center location may be determined based on the estimated pose of the eye, determined by an eye model that was calibrated using the cornea.

At operation 430, a shift vector (e.g. shift vectors 230 or 232) is determined between the first and second center locations. This vector represents an indication of the contact lens shift associated with the particular eye pose. In some embodiments, the two center locations are projected into a two-dimensional plane, so that the shift vector is a two-dimensional vector. As shown, operations 410 to 430 may be repeated multiple times for multiple eye poses, until a sufficient number of eye poses or shift vectors have been recorded.

At operation 440, the HMD device determines whether a standard deviation of the magnitudes of the shift vectors (e.g. standard deviation 350) exceeds a specified threshold. As discussed, this standard deviation is calculated to quantify the degree of contact lens shift of the eye across multiple eye poses, and it is compared to a set threshold to determine whether the contact lens shift is excessive (or tolerable by the gaze tracking system). If the contact lens shift is not considered excessive, the gaze tracking system may simply operate normally. However, if the detected contact lens shift is excessive, the process proceeds to operations 450 and 460.

At operation 450, a user notification of the excessive contact lens shift is generated for the user. The user notification may be generally as a visual signal via the display of the HMD device. In some embodiments, the user notification may include certain recommendations or instructions to mitigate the contact lens shift, such as retrying the HMD device after eye drops, using a clip-on lens in place of the contact lens, or other mitigation measures.

At operation 460, the HMD device may activate a compensation technique of the gaze tracking system or the HMD display controller to compensate for the detected contact lens shift during operation of the gaze tracking system or HMD display. For example, in some embodiments, the HMD device may gradually monitor the shifting contact lens to update the shift vectors or construct a more sophisticated contact lens model, which can be used to autocorrect the gaze estimation of the gaze tracker. In some embodiments, the shift vectors may be used to modify one or more other determined parameters of the eye, such as the height or width of the eye's effective field of vision, which may be used to set the display boundaries of the display to optimize the user experience.

As shown, once the user enrollment process is complete, an operating session of the gaze tracking system of the HMD may be performed. The operating session may be performed during an AR or VR user session where the user's gaze direction is continuously monitored. In some embodiments, during the gaze tracking system operating session, the contact lens shift of the eye may be monitored by repeatedly analyzing additional captured images of the eye. In some embodiments, these additional images may not be keyframes associated with known gaze locations, but simply images of random eye poses observed during the user session. In some embodiments, the second center location used for the detection may be the center location of the eye inferred from the gaze direction. In some embodiments, the HMD device may track a moving window of shift vectors over time and continuously monitor the standard deviation of the vector magnitudes. In some embodiments, the monitoring process may watch for a significant contact lens shifting event. If a sufficient number of significant lens shifting events are detected during a short period of time, the HDM device may generate a user warning, activate a compensation technique, or stop the gaze tracking from operating altogether.

Figure 5:
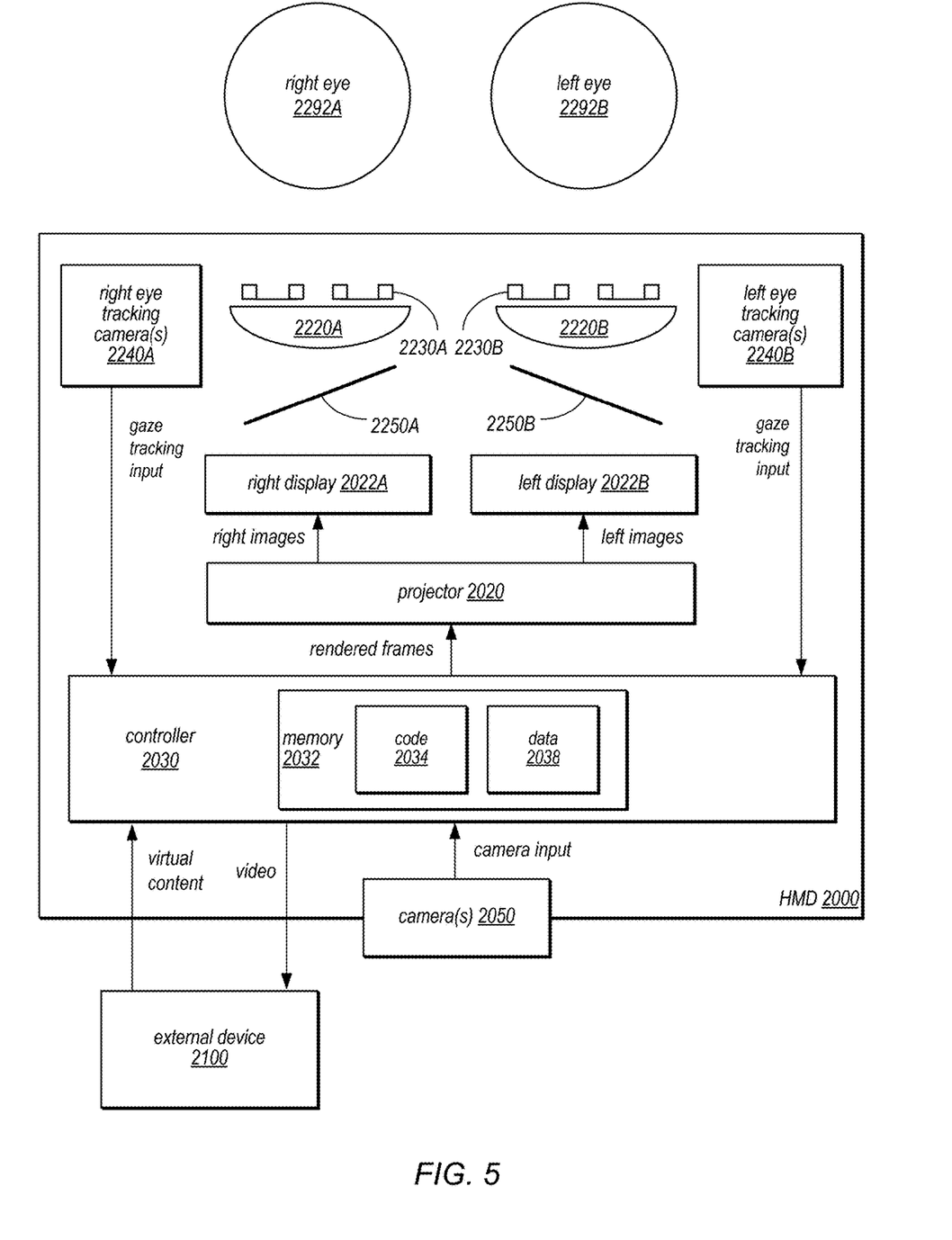
FIG. 5 is a block diagram illustrating various components of an example VR/AR system that implements contact lens shift detection, according to some embodiments.

FIG. 5 is a block diagram illustrating various components of an example VR/AR system that implements the lens distance test, according to some embodiments. In some embodiments, a VR/AR system may include an HMD 2000 such as a headset, helmet, goggles, or glasses. HMD 2000 may implement any of various types of virtual reality projector technologies. For example, the HMD 2000 may include a VR projection system that includes a projector 2020 that displays frames including left and right images on screens or displays 2022A and 2022B that are viewed by a user through eye lenses 2220A and 2220B. The VR projection system may, for example, be a DLP (digital light processing), LCD (liquid crystal display), or LCOS (liquid crystal on silicon) technology projection system. To create a three-dimensional (3D) effect in a 3D virtual view, objects at different depths or distances in the two images may be shifted left or right as a function of the triangulation of distance, with nearer objects shifted more than more distant objects. Note that other types of projection systems may be used in some embodiments.

In some embodiments, HMD 2000 may include a controller 2030 that implements functionality of the VR/AR system and that generates frames (each frame including a left and right image) that are displayed by the projector 2020. In some embodiments, HMD 2000 may also include a memory 2032 that stores software (code 2034) of the VR/AR system that is executable by the controller 2030, as well as data 2038 that may be used by the VR/AR system when executing on the controller 2030. For example, in some embodiments, the code 2034 may include code to execute the contact lens shift detection process 170, and the data 2038 may include the captured eye images 120 and the determined shift vectors 310.

In some embodiments, HMD 2000 may also include one or more interfaces (e.g., a Bluetooth technology interface, USB interface, etc.) that communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) that implement any suitable instruction set architecture, and may execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores that each execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more cameras 2050 that capture video of the user's environment for AR applications. In some embodiments, the HMD 2000 may render and display frames to provide an augmented or mixed reality (AR) view for the user at least in part according to camera 2050 inputs. The AR view may include renderings of the user's environment, including renderings of real objects in the user's environment, based on video captured by one or more video cameras 2050 that capture high-quality, high-resolution video of the user's environment for display. In some embodiments, the cameras 2050 may be equipped with autofocus mechanisms. While not shown, in some embodiments, the HMD 2000 may also include one or more sensors that collect information about the user's environment and actions (depth information, lighting information, user motions and gestures, etc.). The cameras 2050 and sensors may provide the information to the controller 2030 of the VR/AR system.

As shown, HMD 2000 may be positioned on the user's head such that the displays 2022A and 2022B and eye lenses 2220A and 2220B are disposed in front of the user's eyes 2292A and 2292B. IR or NIR light sources 2230A and 2230B (e.g., IR or NIR LEDs) may be positioned in the HMD 2000 (e.g., around the eye lenses 2220A and 2220B, or elsewhere in the HMD 2000) to illuminate the user's eyes 2292A and 2292B with IR or NIR light. Eye tracking cameras 2240A and 2240B (e.g., IR or NIR cameras, for example 400×400 pixel count cameras) are located at each side of the user's face, for example at or near the user's cheek bones. Note that the location of eye tracking cameras 2240A and 2240B is given by way of example, and is not intended to be limiting. In some embodiments, there may be a single eye tracking camera 2240 located on each side of the user's face. In some embodiments there may be two or more eye tracking cameras 2240 on each side of the user's face. For example, in some embodiments, a wide-angle camera 2240 and a narrower-angle camera 2240 may be used on each side of the user's face. A portion of IR or NIR light emitted by light sources 2230A and 2230B reflects off the user's eyes 2292A and 2292B either directly to respective eye tracking cameras 2240A and 2240B or via mirrors 2250A and 2250B located between the user's eyes 2292 and the displays 2022, and is captured by the eye tracking cameras 2240A and 2240B to image the user's eyes 2292A and 2292B. Gaze tracking information captured by the cameras 2240A and 2240B may be provided to the controller 2030. The controller 2030 may analyze the gaze tracking information (e.g., images of the user's eyes 2292A and 2292B) to determine gaze direction, eye position and movement, pupil dilation, or other characteristics of the eyes 2292A and 2292B.

The gaze tracking information obtained and analyzed by the controller 2030 may be used by the controller in performing various VR or AR system functions. For example, the point of gaze on the displays 2022A and 2022B may be estimated from images captured by the eye tracking cameras 2240A and 2240B using the glint-assisted methods. The estimated point of gaze may, for example, be used to render virtual content differently based on the determined direction of the user's gaze.

Embodiments of the HMD 2000 as illustrated herein may also be used in virtual reality (VR) applications to provide VR views to the user. In these embodiments, the controller 2030 of the HMD 2000 may render or obtain virtual reality (VR) frames that include virtual content, and the rendered frames may be provided to the projector 2020 of the HMD 2000 for display to displays 2022A and 2022B. In some embodiments, for VR applications, the controller 2030 may obtain distance information for virtual content to be displayed on the display panels 2022, and may use this distance information to direct the eye lenses 2220 to adjust focus according to the distance of virtual content that the user is currently looking at according to the gaze tracking information.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A head-mounted display (HMD), comprising:
 one or more one or more processors configured to detect a contact lens shift associated with an eye, including to:
  capture one or more images of the eye;
  analyze the one or more images to estimate:
   a first center location of the eye, and
   a second center location of the eye based at least in part on a shape of a detected cornea of the eye;
  determine that a difference between the first center location and the second center location causes a contact lens shift threshold to be exceeded;
  detect, based at least in part on the exceeding of the contact lens shift threshold, that the eye is disposed behind a contact lens and that the contact lens shifts excessively relative to the eye; and
  activate a gaze tracking compensation technique, during an operating session following an enrollment process, in response to said detecting that the contact lens shifts excessively relative to the eye, based at least in part on the exceeding of the contact lens shift threshold.

2. The system of claim 1, wherein the first center location is determined based at least on one or more other detected features of the eye including a pupil, an iris, or a limbus of the eye.

3. The system of claim 1, wherein the second center location is determined based at least in part on a pose of the eye determined from an eye model.

4. The system of claim 1, wherein to determine the difference between the first center location and the second center location, the HMD device determines a shift vector between the first center location and the second center location in a two-dimensional plane.

5. The system of claim 1, wherein to detect the contact lens shifts excessively, the HMD is configured to:
 capture images in multiple orientations of the eye;
 determine multiple shift vectors for individual ones of the orientations;
 determine a standard deviation of magnitudes of the multiple shift vectors; and
 determine that the standard deviation exceeds the contact lens shift threshold.

6. The system of claim 1, wherein:
 the HMD includes:
  a display configured to generate visual content for a user, and
  a gaze tracking system configured to track a gaze direction of the user towards the display; and
 the detection of the contact lens shift is performed during the enrollment process of the user to calibrate the gaze tracking system for the user.

7. The system of claim 6, wherein, to perform the enrollment process, the HMD is configured to:
 instruct the user to orient the eye towards specified points shown on the display;
 capture key frames of the eye for individual ones of the specified points; and
 detect the contact lens shift using the key frames.

8. The system of claim 6, wherein:
 the gaze tracking system includes:
  a plurality of light emitting diodes (LEDs) configured to emit lights towards the eye, and
  two or more cameras configured to capture reflections of the lights emitted by the LEDs; and
 the first center location or the second center location of the eye are determined based at least in part on the reflections captured by the two or more cameras.

9. The system of claim 6, wherein the HMD device is configured to generate a notification of the contact lens shift via the display.

10. The system of claim 6, wherein the HMD device is configured to implement the compensation technique to compensate for the contact lens shift during the operating session of the gaze tracking system.

11. The system of claim 10, wherein the HMD device is configured to repeatedly analyze captured images of the eye during the operating session to monitor contact lens shift associated with the eye.

12. A method, comprising:
   detecting, by a head-mounted display (HMD) implemented using one or more processors, a contact lens shift associated with an eye, the detection including:
      capturing one or more images of the eye;
      analyzing the one or more images to estimate:
         a first center location of the eye, and
         a second center location of the eye based at least in part on a shape of a detected cornea of the eye;
      determining that a difference between the first center location and the second center location causes a contact lens shift threshold to be exceeded;
      detecting, based at least in part on the exceeding of the contact lens shift threshold, that the eye is disposed behind a contact lens and that the contact lens shifts excessively relative to the eye; and
      activating a gaze tracking compensation technique, during an operating session following a user enrollment, in response to said detecting that the contact lens shifts excessively relative to the eye, based at least in part on the exceeding of the contact lens shift threshold.

13. The method of claim 12, wherein the first center location is determined based at least on one or more other detected features of the eye including a pupil, an iris, or a limbus of the eye.

14. The method of claim 12, wherein the second center location is determined based at least in part on a pose of the eye determined from an eye model.

15. The method of claim 12, wherein determining the difference between the first center location and the second center location comprises determining a shift vector between the first center location and the second center location in a two-dimensional plane.

16. The method of claim 12, wherein detecting the contact lens shift s excessively comprises:
   capturing images in multiple orientations of the eye;
   determining multiple shift vectors for individual ones of the orientations;
   determining a standard deviation of magnitudes of the multiple shift vectors; and
   determining that the standard deviation exceeds the contact lens shift threshold.

17. The method of claim 12, wherein:
   the HMD includes:
      a display configured to generate visual content for a user, and
      a gaze tracking system configured to track a gaze direction of the user towards the display; and
   the detection of the contact lens shift is performed during an enrollment process of the user to calibrate the gaze tracking system for the user.

18. The method of claim 17, further comprising the HMD device generating a notification of the contact lens shift via the display.

19. The method of claim 17, further comprising the HMD device activating the compensation technique to compensate for the contact lens shift during an operating session of the gaze tracking system.

20. One or more non-transitory computer readable media storing program instructions that when executed by one or more processors of a head-mounted display (HMD) cause the HMD to detect a contact lens shift associated with an eye, including to:
   capture one or more images of the eye;
   analyze the one or more images to estimate:
      a first center location of the, and
      a second center location of the eye based at least in part on a shape of a detected cornea of the eye;
   determine that a difference between the first center location and the second center location causes a contact lens shift threshold to be exceeded;
   detect, based at least in part on the exceeding of the contact lens shift threshold, that the eye is disposed behind a contact lens and that the contact lens shifts excessively relative to the eye; and
   activate a gaze tracking compensation technique, during an operating session following a user enrollment, in response to said detecting that the contact lens shifts excessively relative to the eye, based at least in part on the exceeding of the contact lens shift threshold.

* * * * *